US012632410B2

(12) United States Patent
Kitson et al.

(10) Patent No.: US 12,632,410 B2
(45) Date of Patent: May 19, 2026

(54) LAZY PLUGGABLE FILE HANDLING

(71) Applicant: Microsoft Technology Licensing, LLC, Redmond, WA (US)

(72) Inventors: Jennifer Elizabeth Kitson, Enfield (GB); Alex John Hockey, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/494,755

(22) Filed: Oct. 25, 2023

(65) Prior Publication Data

US 2025/0139052 A1      May 1, 2025

(51) Int. Cl.
*G06F 16/11*          (2019.01)

(52) U.S. Cl.
CPC .................................. *G06F 16/116* (2019.01)

(58) Field of Classification Search
CPC ...................................................... G06F 16/116
USPC .......................................................... 707/756
See application file for complete search history.

(56) References Cited

U.S. PATENT DOCUMENTS

| | | | | |
|---|---|---|---|---|
| 6,079,009 A | * | 6/2000 | Wise | ........................ G06F 13/28 |
| | | | | 712/18 |
| 6,112,017 A | * | 8/2000 | Wise | ................... G06F 12/0607 |
| | | | | 711/E12.003 |

| | | | | |
|---|---|---|---|---|
| 6,476,808 B1 | * | 11/2002 | Kuo | ...................... G06T 15/005 |
| | | | | 345/422 |
| 7,428,564 B2 | * | 9/2008 | Gibb | ..................... G06F 17/142 |
| | | | | 708/409 |
| 7,610,285 B1 | * | 10/2009 | Zoellner | ................. G06F 16/35 |
| 9,113,130 B2 | * | 8/2015 | Sandrew | ............. H04N 13/128 |
| 9,659,399 B2 | * | 5/2017 | Hakura | ................... G06T 15/80 |
| 10,296,327 B2 | * | 5/2019 | Govindaraju | ............ G06F 9/52 |
| 10,936,713 B2 | * | 3/2021 | Dehon | .................... G06F 21/52 |
| 11,175,910 B2 | * | 11/2021 | Gowda | .............. G06F 16/1774 |
| 11,347,555 B2 | * | 5/2022 | Lee | ....................... G06F 9/5038 |
| 11,368,403 B2 | * | 6/2022 | Chhabra | ............. G06F 21/6218 |
| 11,526,524 B1 | * | 12/2022 | Saulys | ....................... G06F 8/34 |
| 11,556,474 B1 | * | 1/2023 | Bonanno | ............. G06F 12/0897 |
| 12,175,124 B2 | * | 12/2024 | Strathman | ........... G06F 11/1464 |
| 12,293,430 B2 | * | 5/2025 | Jardosh | ...................... G06T 1/60 |
| 2003/0156652 A1 | * | 8/2003 | Wise | ....................... G06F 13/16 |
| | | | | 711/E12.003 |
| 2005/0114420 A1 | * | 5/2005 | Gibb | ..................... G06F 17/142 |
| | | | | 708/404 |
| 2006/0123010 A1 | * | 6/2006 | Landry | ................... G06F 16/25 |
| 2009/0055436 A1 | * | 2/2009 | Ayeni | ..................... G06Q 30/02 |
| 2012/0079175 A1 | * | 3/2012 | Flynn | ................... G06F 3/0679 |
| | | | | 711/170 |

(Continued)

*Primary Examiner* — Hanh B Thai
(74) *Attorney, Agent, or Firm* — Han Gim; Newport IP, LLC

(57) ABSTRACT

A data processing pipeline is configured to create and utilize a file view—an abstract representation of a data file that includes a data file content handle and metadata comprising file properties and pipeline-definable tags—that is passed from stage to stage in the pipeline using out-of-band processing (i.e., processing that is independent from data file record processing). The stages in the pipeline are configured to transform the file view by modifying the metadata to enable efficient data file record processing while minimizing the amount of content that needs to be pulled from the data file and held in memory between stages.

20 Claims, 15 Drawing Sheets

1000

Set up a pipeline having a plurality of successive processing stages including at least an input stage and an output stage, each stage providing an output that is utilized as an input to a successive stage, in which the pipeline operates in a resource-constrained computing environment — 1005

Receive a plurality of data files at the input stage — 1010

Create a file view for each of the plurality of data files, each file view including metadata and a content handle for accessing content in a respective data file — 1015

Pass the file view of each of the plurality of data files through each successive stage in the pipeline — 1020

Operate the pipeline to transform one or more file views by one or more of the stages, each transformation providing a modification of the metadata or the content in the transformed file view — 1025

Output, from the output stage, a plurality of transformed file views that the processing stages use to obtain data file information without parsing data file content to minimize processor usage in the resource-constrained computing environment — 1030

(56)　　　　　References Cited

U.S. PATENT DOCUMENTS

| | | | |
|---|---|---|---|
| 2013/0266292 A1* | 10/2013 | Sandrew | G06F 16/5838 |
| | | | 386/282 |
| 2014/0294511 A1* | 10/2014 | Bianchi | B65H 51/105 |
| | | | 405/168.4 |
| 2014/0301716 A1* | 10/2014 | Carignan | G11B 27/3027 |
| | | | 386/248 |
| 2014/0337733 A1* | 11/2014 | Rodriguez | H04M 1/72469 |
| | | | 715/718 |
| 2015/0019550 A1* | 1/2015 | Maharajh | H04N 21/6587 |
| | | | 707/736 |
| 2015/0054827 A1* | 2/2015 | Hakura | G06T 1/20 |
| | | | 345/426 |
| 2015/0347434 A1* | 12/2015 | Cope | G06F 16/13 |
| | | | 707/696 |
| 2015/0358595 A1* | 12/2015 | Sandrew | H04N 13/261 |
| | | | 386/282 |
| 2017/0177368 A1* | 6/2017 | DeHon | G06F 12/1408 |
| 2017/0351511 A1* | 12/2017 | Bar-Or | G06F 8/34 |
| 2019/0392547 A1* | 12/2019 | Katouzian | G06N 3/0895 |
| 2020/0104523 A1* | 4/2020 | Theimer | G06F 16/172 |
| 2020/0356726 A1* | 11/2020 | Nelson | G06F 40/284 |
| 2021/0019063 A1* | 1/2021 | Lee | G06F 11/1484 |
| 2021/0055885 A1* | 2/2021 | Strathman | G06F 3/0604 |
| 2021/0124582 A1* | 4/2021 | Kerr | G06F 9/3009 |
| 2022/0043651 A1* | 2/2022 | Govindaraju | G06F 8/71 |
| 2022/0066772 A1* | 3/2022 | Gowda | G06F 16/183 |
| 2022/0138192 A1* | 5/2022 | Colcord | G06F 21/6254 |
| | | | 707/737 |
| 2022/0193558 A1* | 6/2022 | Larson | A63F 13/355 |
| 2022/0414054 A1* | 12/2022 | Parra | G06F 9/3828 |
| 2023/0014438 A1* | 1/2023 | Jones | G06F 8/77 |
| 2023/0017384 A1* | 1/2023 | Woodward | G06F 16/908 |
| 2023/0053733 A1* | 2/2023 | Collura | G06F 9/3806 |
| 2023/0185559 A1* | 6/2023 | Landman | G06F 8/65 |
| | | | 717/171 |
| 2023/0185570 A1* | 6/2023 | Kerr | G06F 12/0888 |
| | | | 712/225 |

* cited by examiner

100

Conventional extract/transform/load (ETL) pipeline (300)

600

700

700

805 — Sort input stream into substreams based on filename

810 — For each substream, place file views into groups, in which each group is less than a predetermined size 815 — Concatenate files in each group and compress 820 — Output a single stream of file views

*FIG 9*
File properties = File name; File size
905
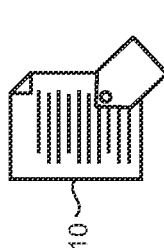
Tags = Group ID
910

*FIG 10*

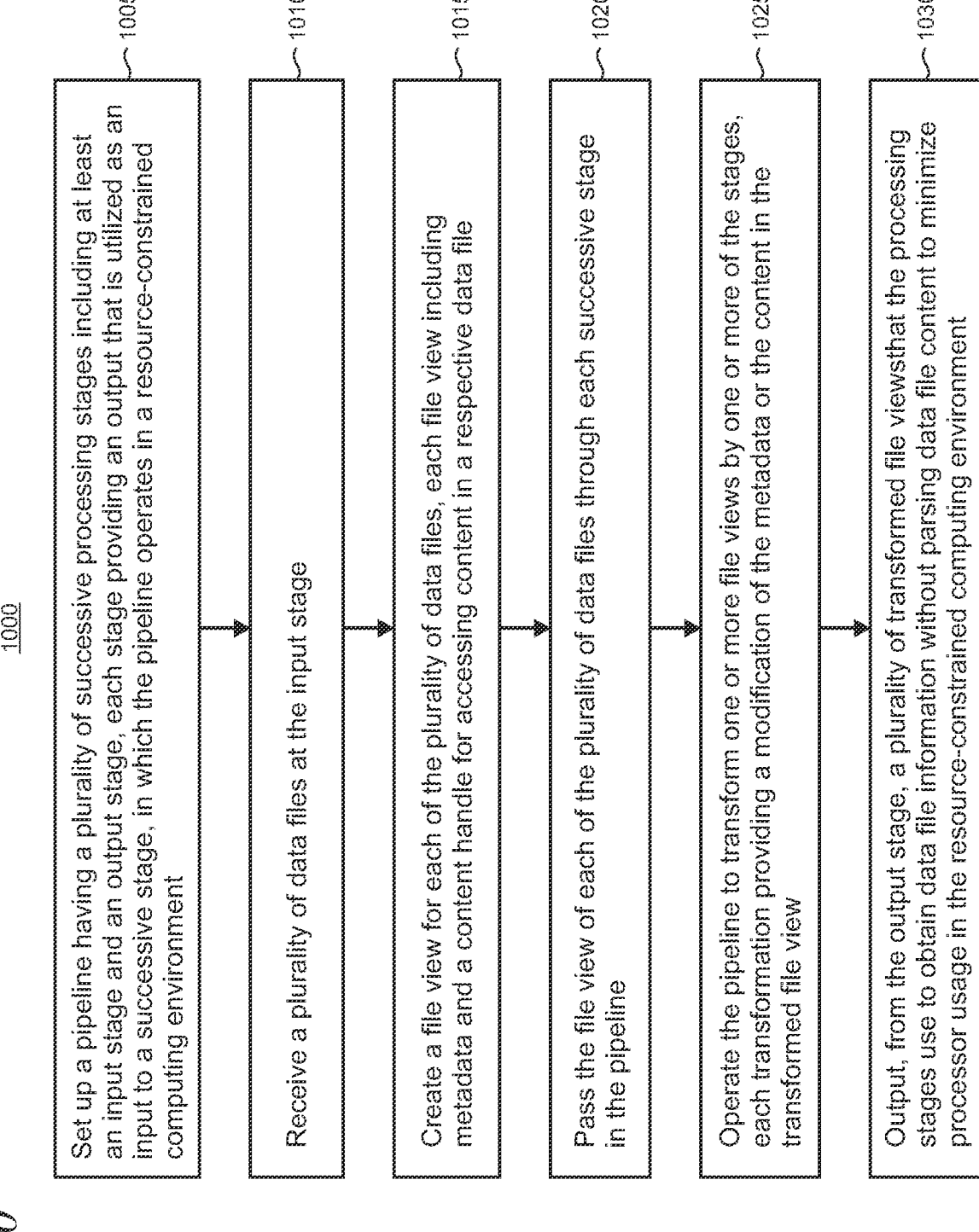

1000

Set up a pipeline having a plurality of successive processing stages including at least an input stage and an output stage, each stage providing an output that is utilized as an input to a successive stage, in which the pipeline operates in a resource-constrained computing environment — 1005

Receive a plurality of data files at the input stage — 1010

Create a file view for each of the plurality of data files, each file view including metadata and a content handle for accessing content in a respective data file — 1015

Pass the file view of each of the plurality of data files through each successive stage in the pipeline — 1020

Operate the pipeline to transform one or more file views by one or more of the stages, each transformation providing a modification of the metadata or the content in the transformed file view — 1025

Output, from the output stage, a plurality of transformed file views that the processing stages use to obtain data file information without parsing data file content to minimize processor usage in the resource-constrained computing environment — 1030

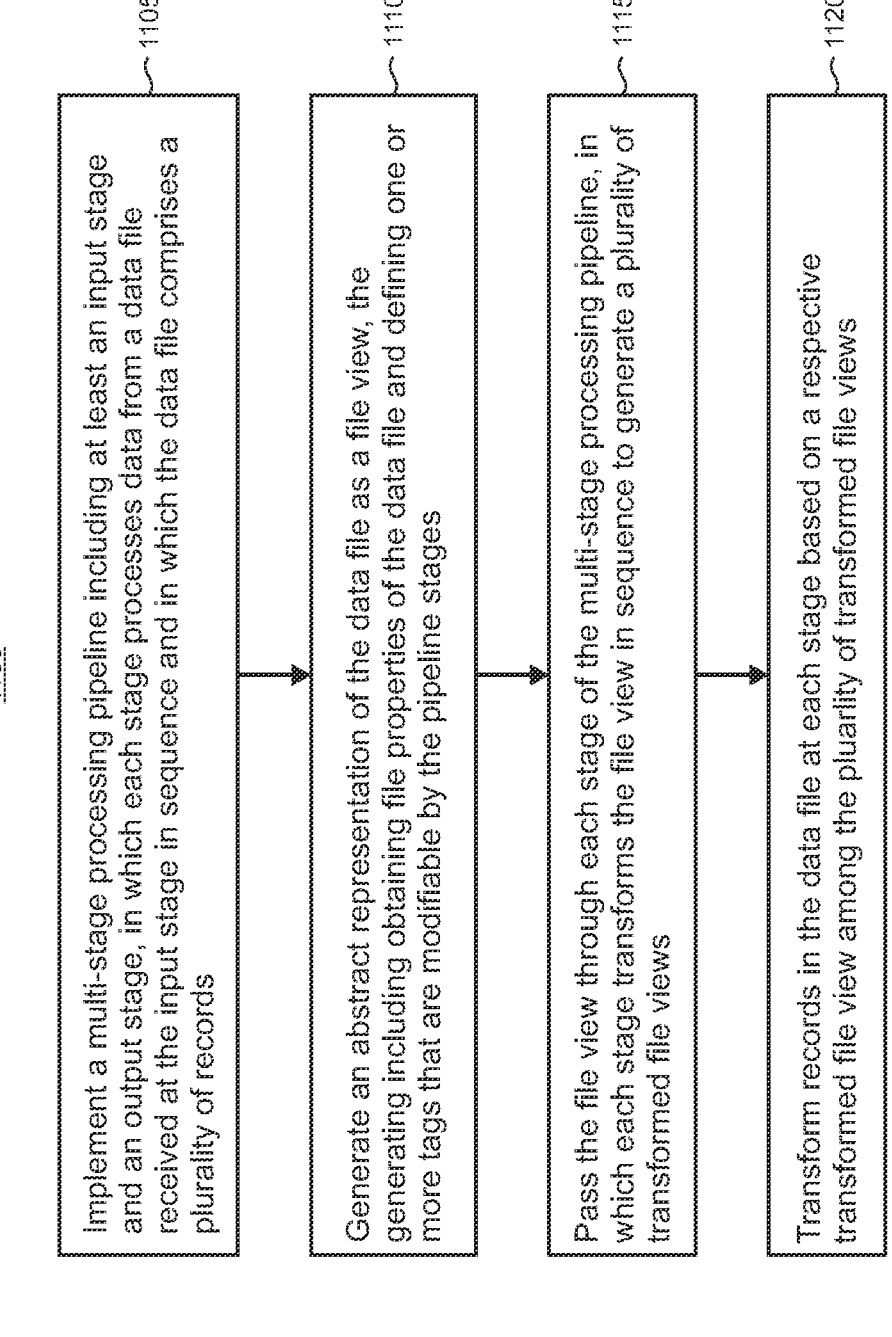

Implement a multi-stage processing pipeline including at least an input stage and an output stage, in which each stage processes data from a data file received at the input stage in sequence and in which the data file comprises a plurality of records ⎯ 1105

Generate an abstract representation of the data file as a file view, the generating including obtaining file properties of the data file and defining one or more tags that are modifiable by the pipeline stages ⎯ 1110

Pass the file view through each stage of the multi-stage processing pipeline, in which each stage transforms the file view in sequence to generate a plurality of transformed file views ⎯ 1115

Transform records in the data file at each stage based on a respective transformed file view among the plurality of transformed file views ⎯ 1120

*FIG 12*

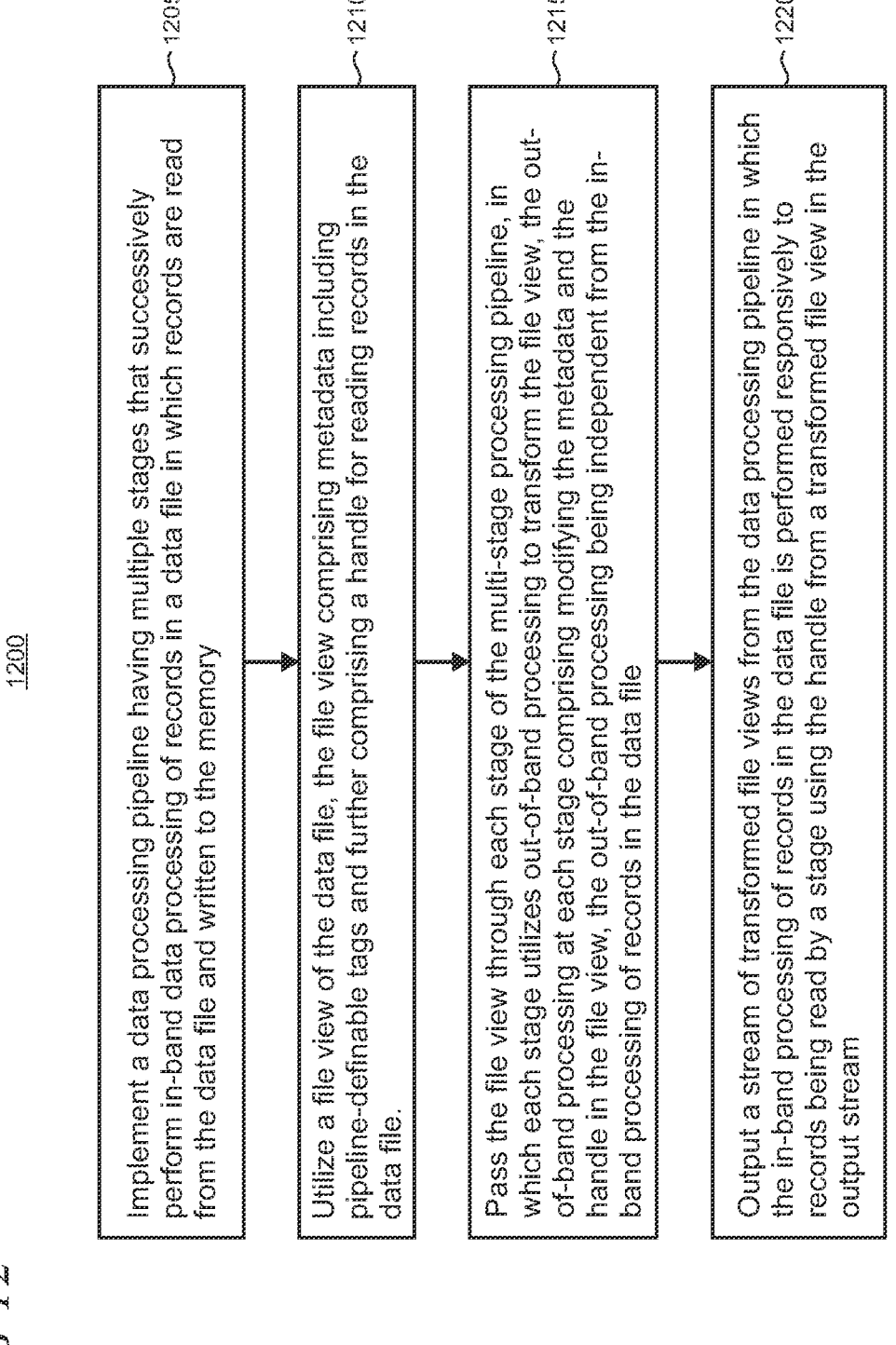

1200

Implement a data processing pipeline having multiple stages that successively perform in-band data processing of records in a data file in which records are read from the data file and written to the memory ⌐1205

Utilize a file view of the data file, the file view comprising metadata including pipeline-definable tags and further comprising a handle for reading records in the data file. ⌐1210

Pass the file view through each stage of the multi-stage processing pipeline, in which each stage utilizes out-of-band processing to transform the file view, the out-of-band processing at each stage comprising modifying the metadata and the handle in the file view, the out-of-band processing being independent from the in-band processing of records in the data file ⌐1215

Output a stream of transformed file views from the data processing pipeline in which the in-band processing of records in the data file is performed responsively to records being read by a stage using the handle from a transformed file view in the output stream ⌐1220

1300

1400

1500

1600

LAZY PLUGGABLE FILE HANDLING

BACKGROUND

Information technology (IT) resources, such as compute and storage resources, are increasingly distributed into hybrid cloud environments including on-premises datacenters and third-party cloud providers. Data processing in either or both on-premises and cloud infrastructure may be handled by a pipeline that passes data through various stages.

SUMMARY

Disclosed are a method, computer-readable storage device, and computing device configured for processing data files using a multi-stage pipeline in which abstract representations of the files, termed file views, are generated at an input stage and passed through the pipeline. Each file view includes a handle to access records in the file (i.e., file content) and metadata comprising file properties and pipeline-definable tags. Later stages are configured to modify the metadata to transform the file views as they progress through the pipeline. Stages use the handle to access records in the data files to thereby transform the file content to meet given pipeline design requirements. Utilization of the transformed file views facilitate lazy data processing in the pipeline because records are only pulled from the data files using the handles and held in memory when needed by the later stages. The pipeline architecture is scalable using extra processing stages that can be added in a plug-in manner to provide increased functionality.

In an illustrative embodiment, the pipeline is configured to output a stream of file views representing multiple different data files received at an input stage of the pipeline. The input stage creates a file view for each data file, including metadata and a content-access handle. The abstracted file view is passed to, and modified by, successive pipeline stages to generate respective transformed file views. The series of transformed file views enables the stages in the pipeline to be efficiently set up for lazy processing of the multiple data files without having to read and store any file content.

In an illustrative embodiment, file views for input data files are created to set up pipeline processing by obtaining file properties and defining tags that are included in the file view metadata. The file views are modifiable by stages in the pipeline to implement transformed file views that are passed along to subsequent stages which can perform additional modifications to generate further transformed file views. Modifications are enabled for the file properties and pipeline-defined tags whereby the metadata is changed or deleted and new metadata types and values are added at subsequent pipeline stages. Data processing is implemented at each stage using its respective file view metadata and handle to lazily pull content through the pipeline. As the memory footprint for the abstract file views is small relative to that for the data files at the pipeline input, the amount of data held in computing system memory is minimized when creating, transforming, and passing the file views through the pipeline.

In an illustrative embodiment, the file view transformations are created and passed through the pipeline using out-of-band processing that is independent of in-band processing of the data files in which file content is read and held in computer memory. The out-of-band processing enables lazy pipeline processing to minimize memory utilization because records are read from the input data files only when they are needed. Use of the metadata in the file views minimizes computer processor utilization because pipeline stages are enabled to consult the metadata rather than having to parse the file content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 9 shows illustrative examples of metadata;

FIGS. 10, 11, and 12 show illustrative methods that may be performed when implementing the present lazy pluggable file handling;

Like reference numerals indicate like elements in the drawings. Elements are not drawn to scale unless otherwise indicated.

DETAILED DESCRIPTION

Figure 1:
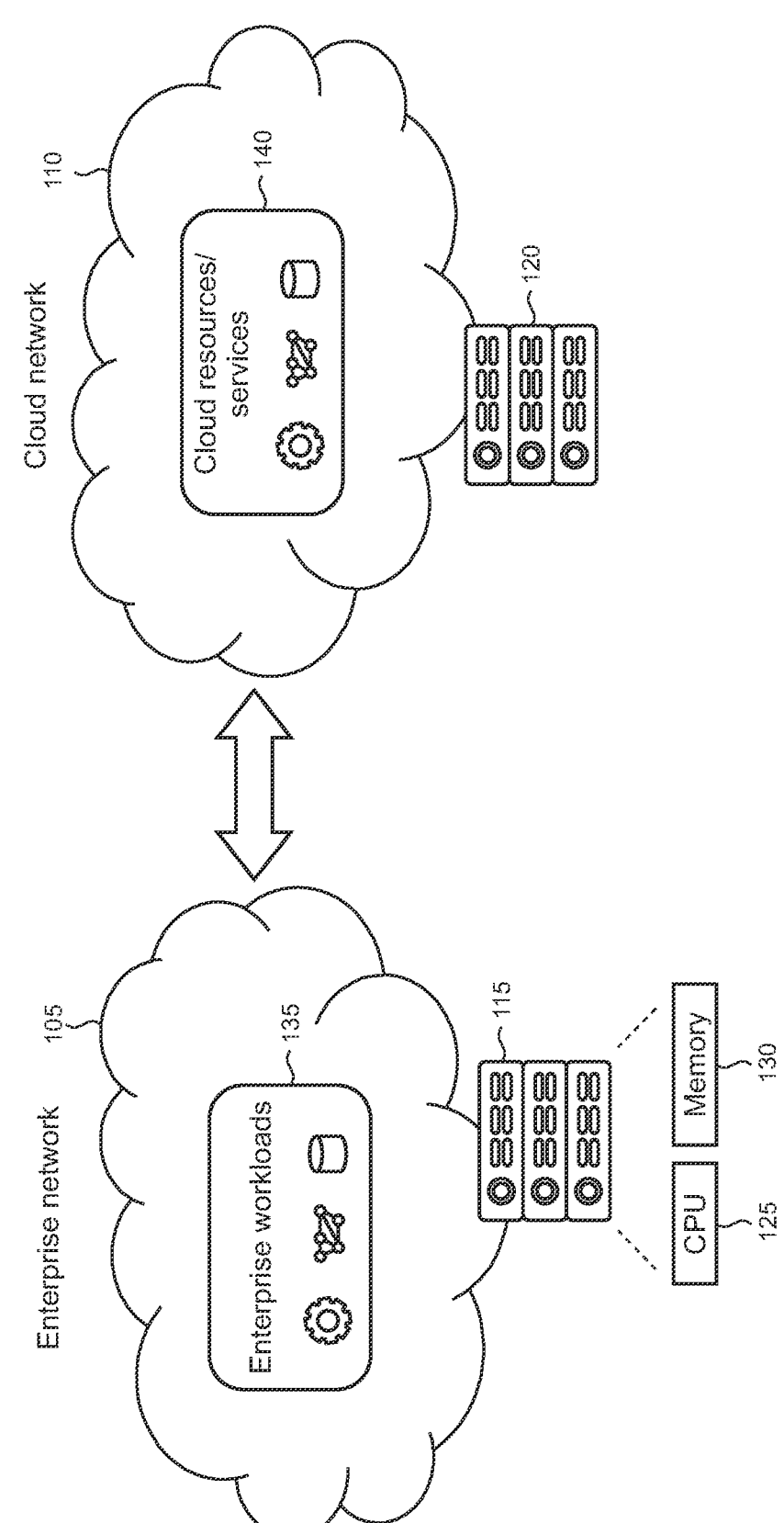
FIG. 1 shows an illustrative hybrid computing environment in which various illustrative embodiments of the lazy pluggable file handling are performable.

A common approach to data processing utilizes a pipeline design in which typically small amounts of data (i.e., "records") in a defined format are passed among pipeline stages. Generally, the records are held in memory between pipeline stages to facilitate the data processing. Pipelines are configured to manipulate records to move and/or transform data in a process chain which can be an effective processing solution in many applications.

Conventional pipeline designs are not always optimal due to scarcity of resources such as processing and memory in typical enterprise and other computing environments. For example, records may be too large for available memory and common workarounds have disadvantages. Dividing larger files into smaller records, processing them in the pipeline, and then reassembling at the end is limited to files with a series of records. Some types of file handling, for example concatenation or compression, may also be more efficiently performed on a whole file at once. Therefore, some efficiency is typically lost by splitting a file into constituent records to feed through a conventional pipeline. Another workaround includes writing the whole file back to disk between pipeline stages instead of passing data between the pipeline stages. This approach requires extra input and output (I/O) steps that add undesirable data processing latency and may present extra pipeline design complexity to coordinate operations among the stages.

The present lazy pluggable file handling provides numerous technical improvements over conventional pipeline designs. Data files in some application environments can be large so pipelines configured to process multiple data files can present excessive demands on the underlying computing infrastructure in resource-constrained environments where processing, network, and memory/storage resources are typically limited. Setting up a pipeline to process large workloads involving multiple data files using traditional techniques can be resource-intensive and give rise to high costs as infrastructure utilization is increased. Using disk write-backs to reduce the memory utilization for pipeline processing of large workloads presents additional challenges because storage can be a scarce resource and the additional processing latency is often undesirable in many applications, particularly, for example, where real-time or near-real-time services are implemented using pipeline processing.

In comparison to conventional pipeline designs, the present lazy pluggable file handling enables pipeline processing to be set up with a minimal impact on computing infrastructure utilization because the abstract file views, handled in an out-of-band process, are relatively small compared to data files. File views are passed between stages and utilized to configure the pipeline stages without needing to actually parse records in the data files. For example, when pipeline processing involves multiple files with records that need to be combined or filtered, the file views enable information to be passed among stages while minimizing data that needs to be copied or held in system memory.

Information is passed in file views that would not be possible to obtain using conventional lazy processing. For example, in a pipeline that is configured to process data files having comma-separated values (CSV) with data compression, metadata can be written to the file view to indicate the number of records in each input data file. With the metadata in the file views, pipeline stages subsequent to a compression stage can still know how many records are in the file even though the compression might have made it impractical to determine such information with conventional lazy processing when file contents have been transformed. Accordingly, the efficiency of pipeline processing is improved using the out-of-band file view processing because information can be effectively shared between pipeline stages to reduce lazy processing overhead and minimize memory consumption.

Turning now to the drawings, FIG. 1 shows an illustrative hybrid computing environment 100 in which various illustrative embodiments of the lazy pluggable file handling are performable. The environment includes an enterprise network 105 and a cloud network 110. Each network is respectively supported by underlying computing infrastructure 115 and 120, such as computer servers and the like, that provide resources such as CPU (central processing unit) and memory resources, as representatively indicated by reference numerals 125 and 130. The enterprise network supports enterprise workloads 135 that represent various computing tasks, processes, and transactions that may vary by enterprise type, size, and other factors. The enterprise network is configured in this illustrative example to connect to the cloud network that provides various cloud resources and/or services 140. Such resources/services include those relating to, for example, compute, network, and/or storage.

Figure 2:
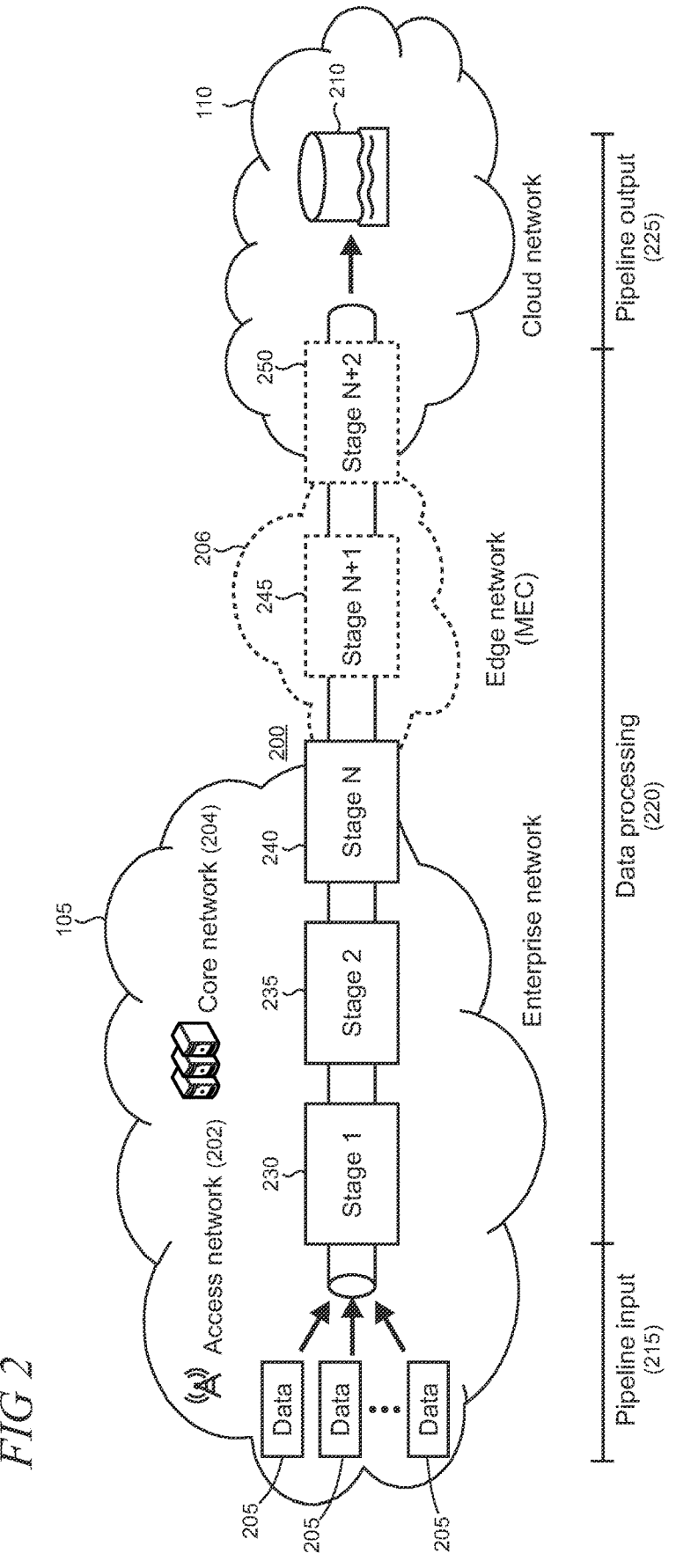
FIG. 2 shows an illustrative data processing pipeline through which data from an enterprise network is ingested and output to a data lake in a cloud network.

FIG. 2 shows an illustrative data processing pipeline 200 which data 205 from the enterprise network 105 is ingested and output to a data lake 210 in the cloud network 110. This particular pipeline configuration and application environment is intended to be exemplary and not limiting and is provided to assist in the exposition of the present principles. The data can comprise varying types and come from various sources, both internal and/or external to the enterprise network.

In some implementations, the enterprise network 105 provides mobile network functionality facilitated by infrastructure including an access network 202 and a core network 204. Such mobile network components are configured to enable services to various mobility access devices (not shown) such as smartphones, IoT (Internet of Things) devices, user equipment (UE), and other mobile computing devices supported in the enterprise networking environment that provide and consume data. The network may support mobile services using 4G ($4^{th}$ generation) and/or 5G ($5^{th}$ generation) mobile networking technologies provided, for example, by private and/or public mobile operators (MOs).

The data processing pipeline 200 is arranged in different functional sections including an input 215 for receiving data from sources, a data processing section 220, and an output 225 that is coupled to a destination, in this example, the data lake 210. The pipeline, in this illustrative example includes multiple stages 230, 235, and 240 that are arranged to process data in series from input to output. The number of pipeline stages utilized in a given implementation of the present lazy pluggable file handling can vary to meet applicable requirements.

In this illustrative example, the stages 230, 235, and 240 are implemented in the computing infrastructure underlying the enterprise network 105. In alternative implementations, one or more pipeline stages, as representatively indicated by the dashed rectangle and reference numeral 250, are implemented in the computing infrastructure underlying the cloud network 110. The particular functional computing split between enterprise and cloud computing networks can vary by implementation.

In an optional implementation, an edge network 206 is utilized to provide a small-footprint extension of the cloud network 110. For example, in mobile network applications, the edge network is realized using multi-access edge compute (MEC) sites that are typically located in or near data centers operated by a mobile or enterprise operator to run workloads that require low latency. The placement of MEC sites close to the enterprise network 105 offers lower latency for applications that are accessed from mobile devices connected to the access network 202.

The MEC infrastructure facilitates access to services and resources on the cloud network through a network architecture that provides a direct and optimized connection to the core network 204. In some cases, various services can be directly supported in the edge network to enable deployment of workloads closer to applications and users in the enterprise network 105. Control planes for such services may be deployed in the cloud network 110, while data planes are deployed at the edge network 206. One or more pipeline stages, as representatively indicated by the dashed rectangle and reference numeral 245 are implemented in the computing infrastructure underlying the edge network in this optional implementation of the present principles.

Figure 3:
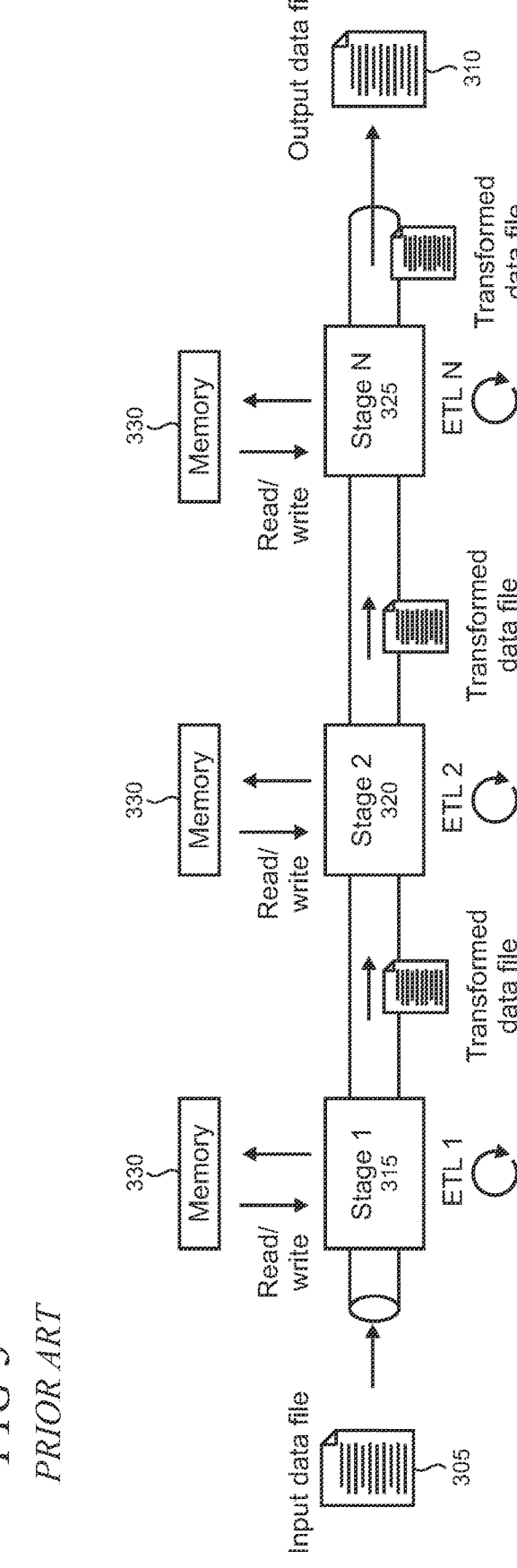
FIG. 3 shows an illustrative conventional data processing pipeline that is implemented to perform extract, transform, and load (ETL) operations.

FIG. 3 shows an illustrative conventional data processing pipeline 300 that is implemented to perform extract, transform, and load (ETL) operations in accordance with commonly known computing principles. In the conventional pipeline, an input data file 305 is transformed to an output data file 310 in a series of stages, 315, 320, and 325. Each stage performs an ETL operation to generate a transformed data file that is passed through the pipeline to a subsequent stage.

In the conventional pipeline processing, records from input data files and/or transformed data files are stored to support the ETL operations in the stages 315, 320, and 325 in a memory 330, for example, a memory that is instantiated in a computer server (not shown), using read and write operations. There are many scenarios which require data stored in files to be transformed or moved, where a conventional pipeline approach would be useful.

Figures 4, 5:
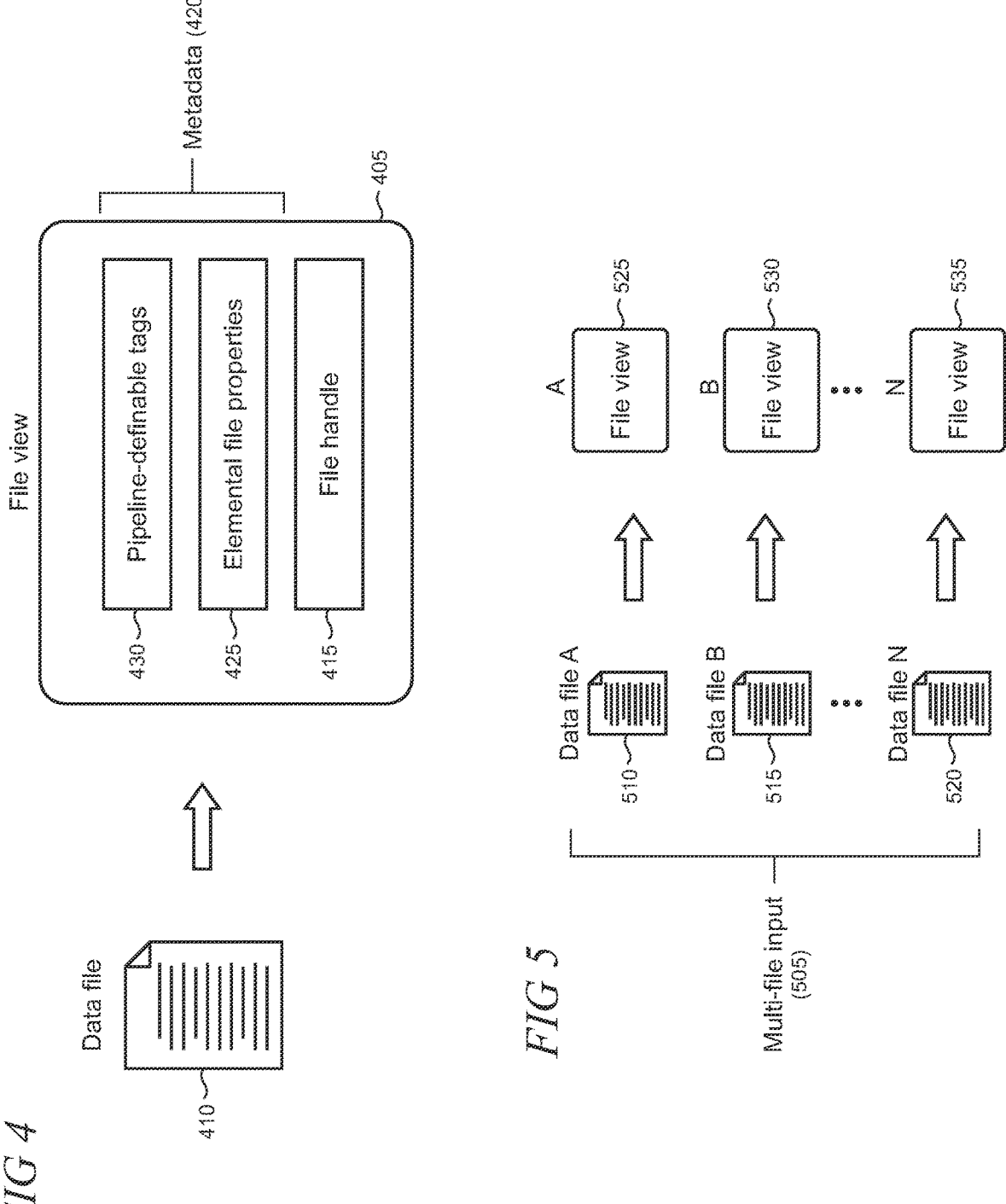
FIG. 4 shows an illustrative file view, in accordance with the present principles, that includes a file handle and provides an abstraction of a data file using metadata comprising elemental file properties and pipeline-definable tags.
FIG. 5 shows an illustrative one-to-one mapping of data files to file views.

In comparison to conventional pipeline data processing, the present lazy pluggable file handling is implemented in a pipeline that utilizes an abstraction of a data file termed a file view. FIG. 4 shows an illustrative file view 405 that provides an abstraction of a data file 410 and which includes a file handle 415 and metadata 420 comprising elemental file properties 425 and pipeline-definable tags 430. The file handle is configured to enable a pipeline stage to access records/content in the data file, typically in a lazy manner.

The elemental file properties 425 comprise a form of metadata that describes details about the data file 410 and/or identifies it. The elemental file properties include, for example and not by way of limitation, file name, author, creation/last change dates, file size, language, record keywords, statistics, and the like. The elemental properties provided in a given data file can vary by implementation of the present principles. In a typical use case, the elemental file properties are selectively extracted from the data file for inclusion in a file view and the selected properties do not necessarily include all that are available.

The pipeline-definable tags 430 comprise a form of metadata that is customizable and modifiable by operation of a pipeline stage using the present lazy pluggable file handling. The pipeline-definable tags may vary by pipeline implementation and typically are distinct from the elemental file properties, although some overlap between the metadata forms that are included in the file view 405 can occur in some cases.

File views are initially generated, as described below, for each data file to be processed using the present lazy pluggable file handling. Thus, as illustratively shown in FIG. 5, when a pipeline is utilized to process an input 505 comprising multiple files (for example, in a concatenation process), an illustrative one-to-one mapping of data files to file views is utilized. As shown, individual data files 510, 515, and 520 are respectively mapped to file views 525, 530, and 535.

Figure 6:
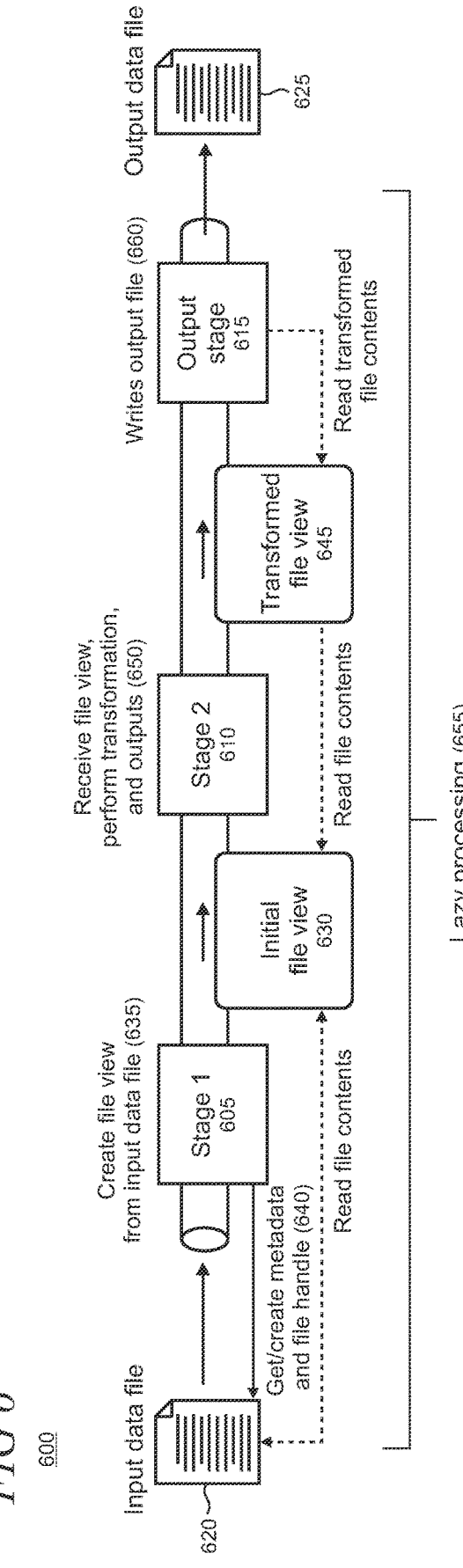
FIG. 6 shows an illustrative pipeline arranged to utilize file view objects when processing data in accordance with the present principles.

FIG. 6 shows an illustrative pipeline 600 arranged to utilize file views when processing data in accordance with the present principles. The pipeline is configured with multiple stages 605, 610, and 615 to perform sequential processing of an input data file 620 to produce an output data file 625 as an output from the pipeline. While a single input data file and a single transformation are utilized for sake of clarity in exposition in this particular illustrative example, the present principles of lazy pluggable file handling are equally well adaptable to multi-file inputs.

The first stage 605 of the pipeline 600, is configured to create an initial file view 630 (as indicated by reference numeral 635) from the input data file 620 by getting metadata from the data file and creating a file handle (640). The initial file view is passed to the subsequent second stage 610 which performs a transformation of the initial file view to generate a transformed file view 645 (650).

The generation of the file views shown in FIG. 6 enables the pipeline 600 to be set up for lazy processing that may be performed in view of prevailing network conditions, resource availability, application requirements, and other factors to optimize network performance. During implementation of the lazy processing (655), each stage sequentially utilizes the file handle and metadata in a respective file view to pull content from the input data file 620 through the pipeline to thereby transform the data, as shown by the dashed lines. The output stage 615 outputs the transformed content to the output file 625 (660) to complete the pipeline processing.

When the stage in the pipeline 600 generates a transformed file view, it modifies the handle to capture that transformation that is being applied to the content from the data file 620 in the stage. In an illustrative example, a pipeline is configured to convert documents from English to Spanish languages. Thus, in this example, there is a one-to-one correspondence between the number of input and output data files. The stage copies the metadata at its input and translates a "file name" metadata value to Spanish and sets a "language" metadata value to "Spanish." The stage modifies the file handle (or alternatively generates a new handle) to represent the Spanish version of the input data file. A subsequent stage in the pipeline uses the new/modified handle to pull content from the input data file to perform the language translation.

Figure 7:
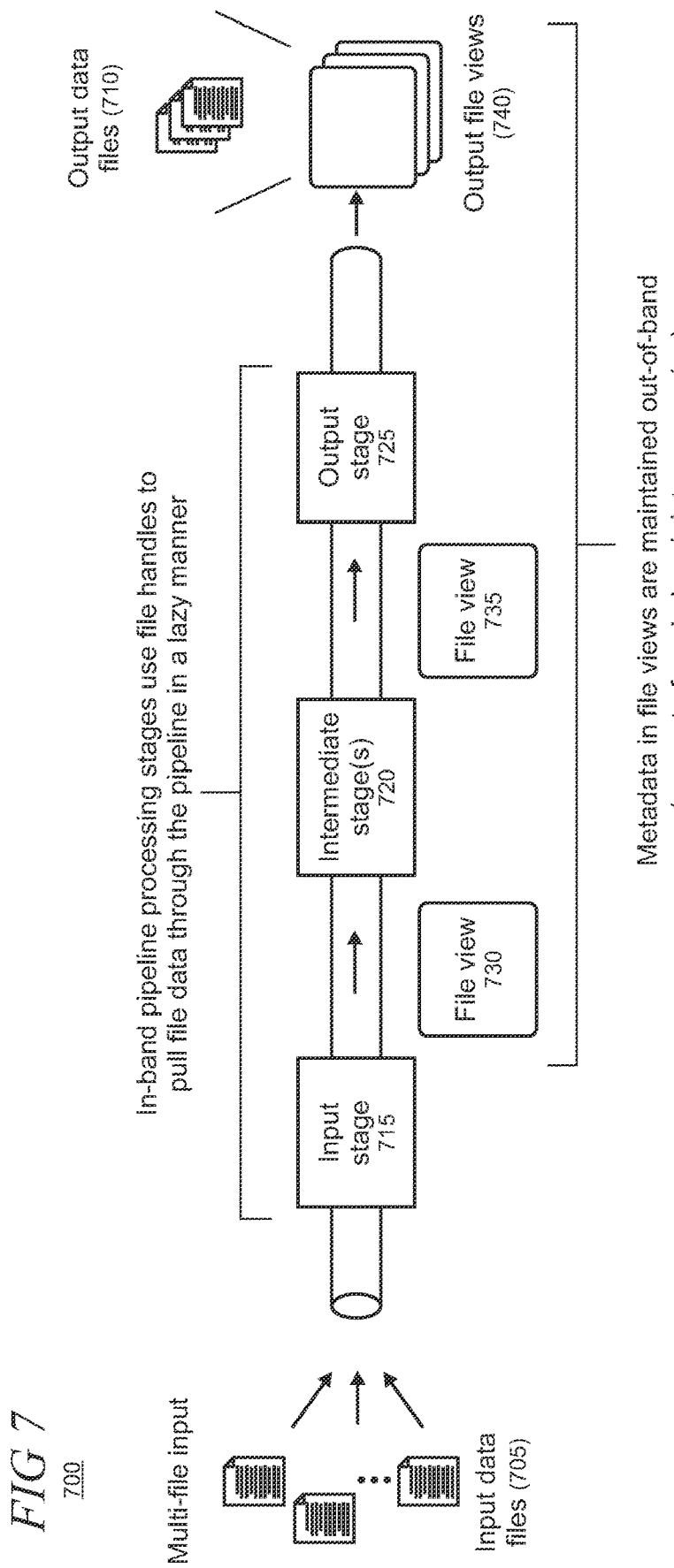
FIG. 7 shows an illustrative pipeline arranged to utilize file views when processing data from multiple different files in accordance with the present principles.

FIG. 7 shows an illustrative pipeline 700 arranged to utilize file views when processing data from multiple different data files 705 in accordance with the present principles. In this illustrative example, the pipeline is configured for processing to sort, concatenate, and compress content from the multiple input data files and produce, as an output, data files 710 that are each a compressed concatenation of multiple sorted files.

The pipeline 700 is configured with an input stage 715, one or more intermediate stages 720, and an output stage 725. The pipeline is set up using a stream of file views (representatively indicated by reference numerals 730, 735, and 740) that are generated by the pipeline stages and output at the output stage. The metadata in the file views is handled using out-of-band processing that is separate from the in-band processing used by the pipeline stages when lazily pulling data file content through the pipeline, as shown in the drawing. Separating the pipeline set-up using the file views from the data processing in the pipeline stages advantageously enables optimization of storage resource utilization, as discussed above, as the metadata in the file views provides information to the pipeline stages that can be inefficient to obtain when reading data file records in a lazy manner.

Figure 8:
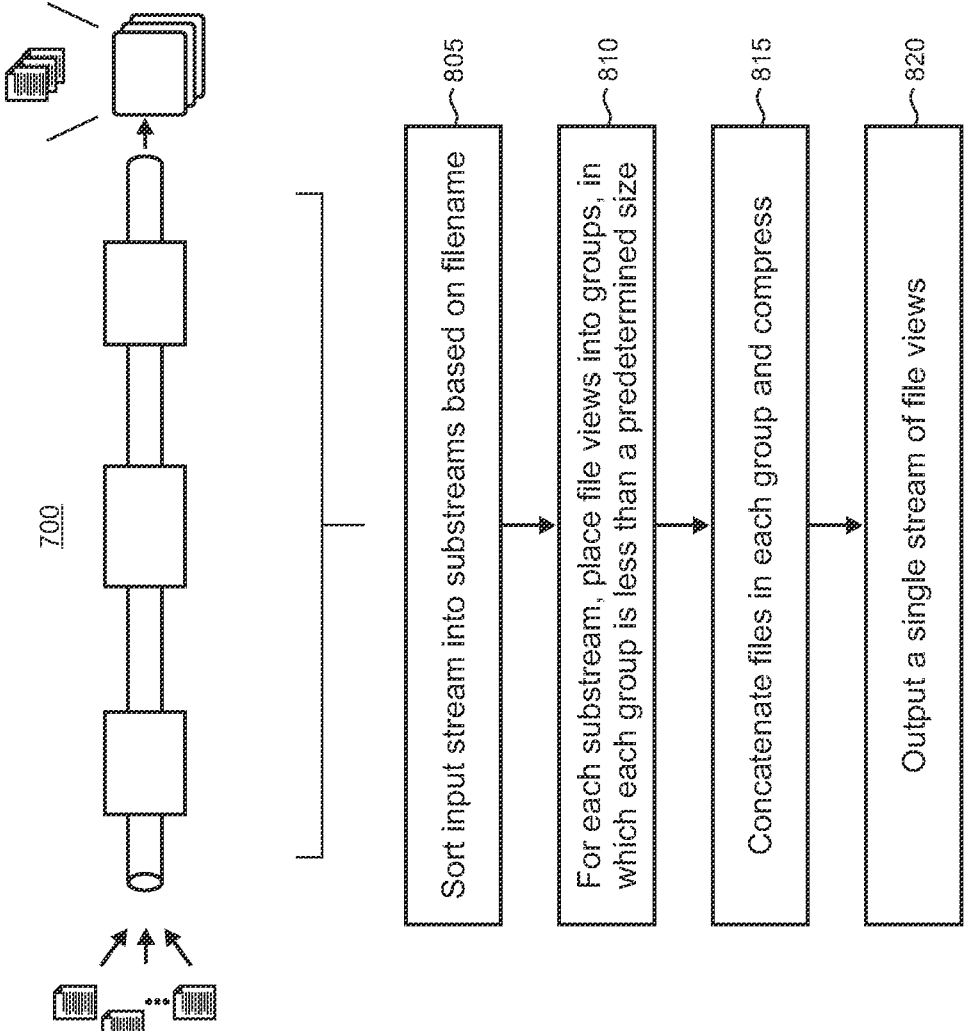
FIG. 8 shows illustrative pipeline set up and processing steps implemented in an embodiment of a pipeline in which data from multiple different data files are sorted and combined in accordance with the present principles.

FIG. 8 shows illustrative pipeline set-up and processing steps implemented in the stages of the pipeline 700 of FIG. 7 in which data from multiple different input data files are sorted and combined to produce output data files that are each a compressed concatenation of multiple sorted files. In step 805, the input data files are sorted, as an input stream to the pipeline, into sub-streams based on filename metadata. In step 810, for each sub-stream, using file size metadata, file views are sorted into groups such that each group has a file size that is below some predetermined threshold, for example, a threshold that is suitable for available memory resources on a given server.

In step 815, data files in each group are concatenated and compressed. In step 820, a single stream of file views is output. Each file view in the output represents a data file that is a compressed concatenation of multiple sorted files. The use of the file views in this illustrative example enables efficient utilization of computing resources because data is not read by the pipeline stages from the input data files until one of the output file views is acted upon to obtain a compressed concatenated result.

FIG. 9 shows illustrative examples of metadata that is utilized in a file view in the preceding illustrative example shown in FIGS. 7 and 8 and discussed above. As noted above, elemental file properties 905 utilized in the file views include file name and file size. Pipeline-definable tags 910 may also be used in the preceding example to indicate membership in a particular group using, for example, a group ID tag. It may be appreciated that other suitable file properties and pipeline-definable tags are usable to meet the needs of a particular application of the present lazy pluggable file handling.

FIG. 10 is a flowchart of an illustrative method 1000 for operating a data processing pipeline. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1005 includes setting up a pipeline having a plurality of successive processing stages including at least an input stage and an output stage, each stage providing an output that is utilized as an input to a successive stage, in which the pipeline operates in a resource-constrained computing environment. Block 1010 includes receiving a plurality of data files at the input stage.

Block 1015 includes creating a file view for each of the plurality of data files, each file view including metadata and a content handle for accessing content in a respective data file. Block 1020 includes passing the file view of each of the plurality of data files through each successive stage in the pipeline.

Block 1025 includes operating the pipeline to transform one or more file views by one or more of the stages, each transformation providing a modification of the metadata or the content in the transformed file view. Block 1030 includes outputting, from the output stage, a plurality of transformed file views that the processing stages use to obtain data file information, without parsing data file content, to minimize processor usage in the resource-constrained computing environment.

FIG. 11 is a flowchart of an illustrative method 1100 in which a multi-stage processing pipeline is implemented. Block 1105 includes implementing a multi-stage processing pipeline including at least an input stage and an output stage, in which each stage processes data from a data file received at the input stage in sequence, and in which the data file comprises a plurality of records. Block 1110 includes generating an abstract representation of the data file as a file view, the generating including obtaining file properties of the data file and defining one or more tags that are modifiable by the pipeline stages.

Block 1115 includes passing the file view through each stage of the multi-stage processing pipeline, in which each stage transforms the file view in sequence to generate a plurality of transformed file views. Block 1120 includes transforming records in the data file in each stage based on a respective transformed file view among the plurality of transformed file views.

FIG. 12 is a flowchart of an illustrative method 1200 performed by a computing device to implement a data processing pipeline. Block 1205 includes implementing a data processing pipeline having multiple stages that successively perform in-band data processing of records in a data file in which records are read from the data file and written to the memory. Block 1210 includes utilizing a file view of the data file, the file view comprising metadata including pipeline-definable tags and further comprising a handle for reading records in the data file.

Block 1215 includes passing the file view through each stage of the multi-stage processing pipeline, in which each stage utilizes out-of-band processing to transform the file view, the out-of-band processing at each stage comprising modifying the metadata and the handle in the file view, the out-of-band processing being independent from the in-band processing of records in the data file. Block 1220 includes outputting a stream of transformed file views from the data processing pipeline in which the in-band processing of records in the data file is performed responsively to records being read by a stage using the handle from a transformed file view in the output stream.

Figure 13:
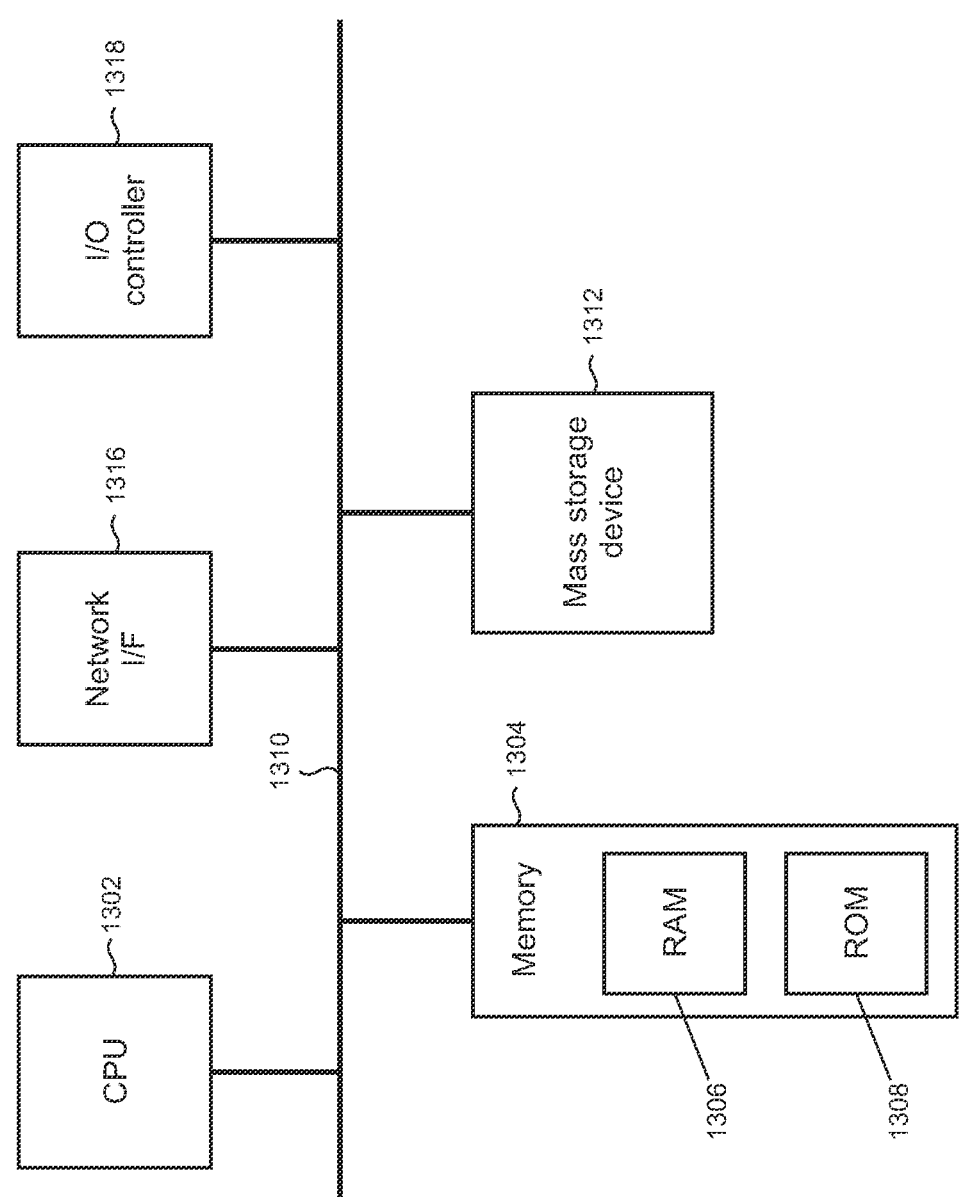
FIG. 13 is a block diagram of an illustrative server or computing device that may be used at least in part to implement the present lazy pluggable file handling.

FIG. 13 shows an illustrative architecture 1300 for a computing device, such as a server, capable of executing the various components described herein for lazy pluggable file handling. The architecture 1300 illustrated in FIG. 13 includes one or more processors 1302 (e.g., central processing unit, dedicated AI chip, graphics processing unit, etc.), a system memory 1304, including RAM (random access memory) 1306 and ROM (read only memory) 1308, and a system bus 1310 that operatively and functionally couples the components in the architecture 1300. A basic input/output system containing the basic routines that help to transfer information between elements within the architecture 1300, such as during startup, is typically stored in the ROM 1308. The architecture 1300 further includes a mass storage device 1312 for storing software code or other computer-executed code that is utilized to implement applications, the file system, and the operating system. The mass storage device 1312 is connected to the processor 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it may be appreciated by those skilled in the art that computer-readable storage media can be any available storage media that can be accessed by the architecture 1300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It may be appreciated that the network interface unit 1316 also may be utilized to connect to other types of networks and remote computer systems. The architecture 1300 also may include an input/output controller 1318 for receiving and processing input from a number of other devices, including a keyboard, mouse, touchpad, touchscreen, control devices such as buttons and switches or electronic stylus (not shown in FIG. 13). Similarly, the input/output controller 1318 may provide output to a display screen, user interface, a printer, or other type of output device (also not shown in FIG. 13).

It may be appreciated that the software components described herein may, when loaded into the processor 1302 and executed, transform the processor 1302 and the overall architecture 1300 from a general-purpose computing system into a special-purpose computing system customized to facilitate the functionality presented herein. The processor 1302 may be constructed from any number of transistors or other discrete circuit elements, which may individually or collectively assume any number of states. More specifically, the processor 1302 may operate as a finite-state machine, in response to executable instructions contained within the software modules disclosed herein. These computer-executable instructions may transform the processor 1302 by specifying how the processor 1302 transitions between states, thereby transforming the transistors or other discrete hardware elements constituting the processor 1302.

Encoding the software modules presented herein may also transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1300 in order to store and execute the software components presented herein. It also may be appreciated that the architecture 1300 may include other types of computing devices, including wearable devices, handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Figure 14:
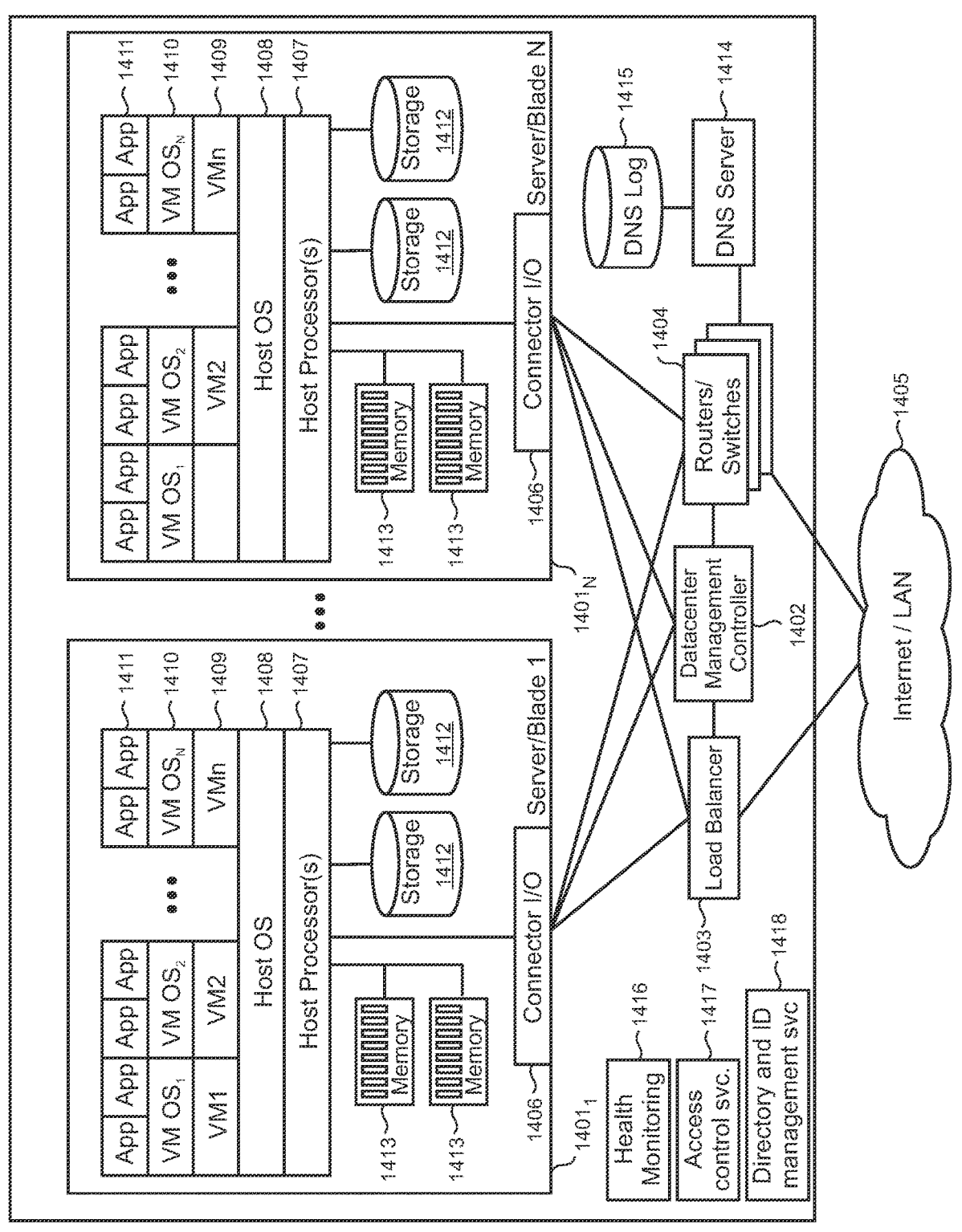
FIG. 14 is a block diagram of an illustrative datacenter that may be used at least in part to implement the present lazy pluggable file handling.

FIG. 14 is a high-level block diagram of an illustrative datacenter 1400 that provides cloud computing services or distributed computing services that may be used to implement aspects of the present lazy pluggable file handling. Datacenter 1400 may incorporate one or more of the features disclosed in the DCs shown in the drawings and disclosed in the accompanying text. A plurality of servers 1401 are managed by datacenter management controller 1402. Load balancer 1403 distributes requests and computing workloads over servers 1401 to avoid a situation wherein a single server may become overwhelmed. Load balancer 1403 maximizes available capacity and performance of the resources in datacenter 1400. Routers/switches 1404 support data traffic between servers 1401 and between datacenter 1400 and external resources and users (not shown) via an external network 1405, which may be, for example, a local area network (LAN) or the Internet.

Servers 1401 may be standalone computing devices, and/or they may be configured as individual blades in a rack of one or more server devices. Servers 1401 have an input/output (I/O) connector 1406 that manages communication with other database entities. One or more host processors 1407 on each server 1401 run a host operating system (OS) 1408 that supports multiple virtual machines (VM) 1409. Each VM 1409 may run its own OS so that each VM OS 1410 on a server is different, or the same, or a mix of both. The VM OSs 1410 may be, for example, different versions of the same OS (e.g., different VMs running different current and legacy versions of the Windows® operating system). In addition, or alternatively, the VM OSs 1410 may be provided by different manufacturers (e.g., some VMs running the Windows® operating system, while other VMs are running the Linux® operating system). Each VM 1409 may also run one or more applications (App) 1411. Each server 1401 also includes storage 1412 (e.g., hard disk drives (HDD)) and memory 1413 (e.g., RAM) that can be accessed and used by the host processors 1407 and VMs 1409 for storing software code, data, etc.

Datacenter 1400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1400 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1409 on server 14011 to run their applications 1411. When demand for an application 1411 increases, the datacenter 1400 may activate additional VMs 1409 on the same server 14011 and/or on a new server 1401N as needed. These additional VMs 1409 can be deactivated if demand for the application later drops.

Datacenter 1400 may offer guaranteed availability, disaster recovery, and back-up services. For example, the datacenter may designate one VM 1409 on server 14011 as the primary location for the tenant's application and may activate a second VM 1409 on the same or a different server as a standby or back-up in case the first VM or server 14011 fails. The datacenter management controller 1402 automatically shifts incoming user requests from the primary VM to the back-up VM without requiring tenant intervention. Although datacenter 1400 is illustrated as a single location, it will be understood that servers 1401 may be distributed to multiple locations across the globe to provide additional redundancy and disaster recovery capabilities. Additionally, datacenter 1400 may be an on-premises, private system that provides services to a single enterprise user or may be a publicly accessible, distributed system that provides services to multiple, unrelated customers and tenants or may be a combination of both.

Domain Name System (DNS) server 1414 resolves domain and host names into IP addresses for all roles, applications, and services in datacenter 1400. DNS log 1415 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 1416 monitors the health of the physical systems, software, and environment in datacenter 1400. Health monitoring 1416 provides feedback to datacenter managers when problems are detected with servers, blades, processors, or applications in datacenter 1400 or when network bandwidth or communications issues arise.

Access control service 1417 determines whether users are allowed to access particular connections and services provided at the datacenter 1400. Directory and identity management service 1418 authenticates user credentials for tenants on datacenter 1400.

Figure 15:
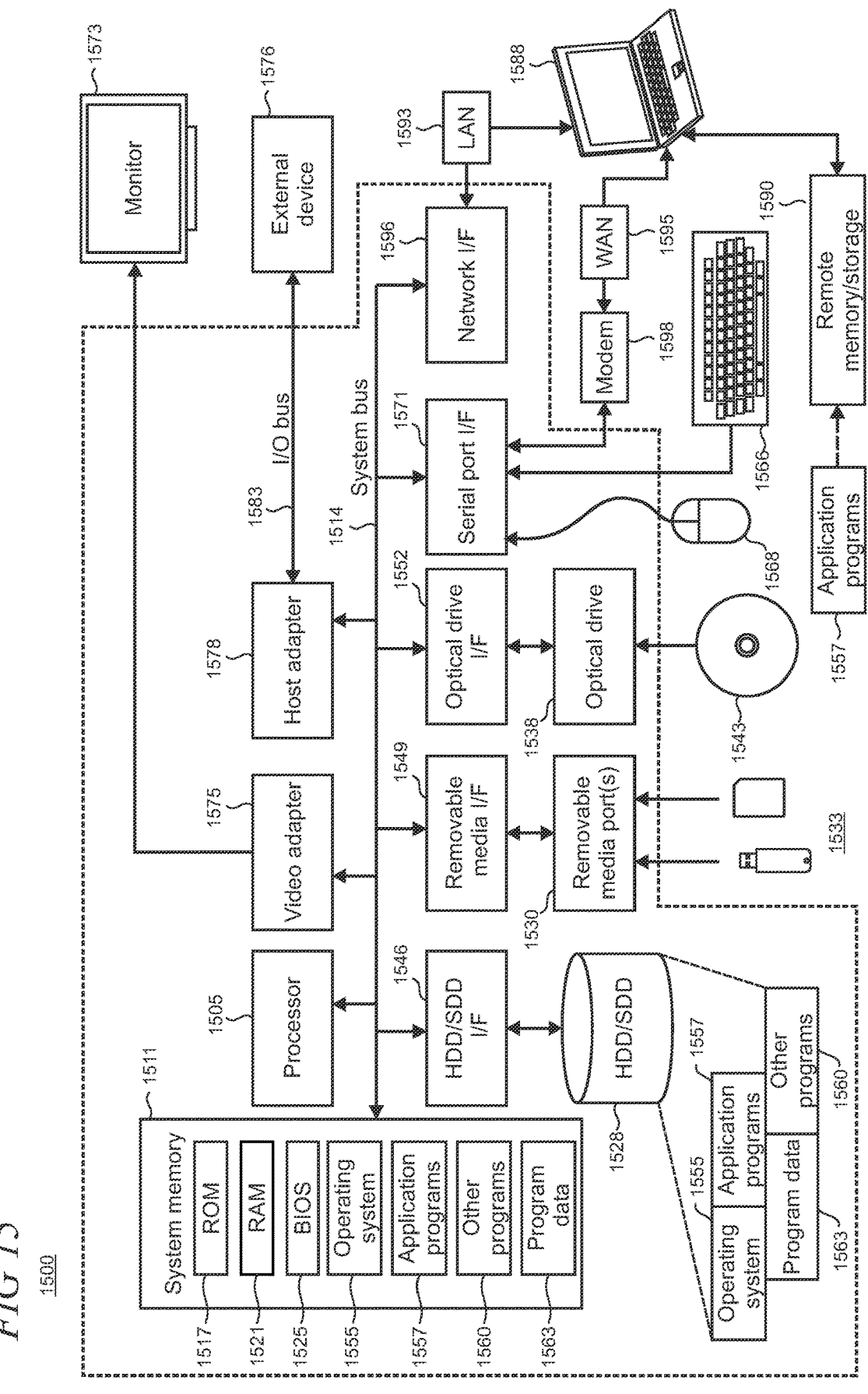
FIG. 15 is a block diagram of an illustrative computer system that may be used at least in part to implement the present lazy pluggable file handling.

FIG. 15 is a simplified block diagram of an illustrative computer system 1500 such as a PC, client machine, or server with which to implement the present lazy pluggable file handling. Computer system 1500 includes a processor 1505, a system memory 1511, and a system bus 1514 that couples various system components including the system memory 1511 to the processor 1505. The system bus 1514 may be any of several types of bus structures including a memory bus or memory controller, a peripheral bus, or a local bus using any of a variety of bus architectures. The system memory 1511 includes read only memory (ROM) 1517 and random access memory (RAM) 1521. A basic input/output system (BIOS) 1525, containing the basic routines that help to transfer information between elements within the computer system 1500, such as during startup, is stored in ROM 1517. The computer system 1500 may further include a hard disk drive (HDD) or solid state drive (SSD) 1528 for reading from and writing to internally disposed storage media, removable media port(s) 1530 for reading from or writing to removable media 1533 (e.g., a flash drive/memory stick or card), and an optical disk drive 1538 for reading from or writing to a removable optical disk 1543 such as a CD (compact disc), DVD (digital versatile disc), or other optical media. The hard disk drive 1528, removable media ports 1530, and optical disk drive 1538 are connected to the system bus 1514 by a hard disk drive interface 1546, a removable media interface 1549, and an optical drive interface 1552, respectively. The drives and their associated computer-readable storage media provide non-volatile storage of computer-readable instructions, data structures, program modules, and other data for the computer system 1500. Although this illustrative example includes an HDD/SDD 1528, a removable media 1533, and a removable optical disk 1543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present lazy pluggable file handling. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the HDD/SDD 1528, removable media 1533, optical disk 1543, ROM 1517, or RAM 1521, including an operating system 1555, one or more application programs 1557, other program modules 1560, and program data 1563. A user may enter commands and information into the computer system 1500 through input devices such as a keyboard 1566 and pointing device 1568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1505 through a serial port interface 1571 that is coupled to the system bus 1514, but may be connected by other interfaces, such as a parallel port, game port, or universal serial bus (USB). A monitor 1573 or other type of display device is also connected to the system bus 1514 via an interface, such as a video adapter 1575. In addition to the monitor 1573, personal computers typically include other peripheral output devices (not shown), such as speakers and printers. The illustrative example shown in FIG. 15 also includes a host adapter 1578, an input/output (I/O) bus 1583

(which may be a serial bus such as USB), and an external device 1576 connected to the I/O bus 1583.

The computer system 1500 is operable in a networked environment using logical connections to one or more remote computers, such as a remote computer 1588. The remote computer 1588 may be selected as another personal computer, a server, a router, a network PC, a peer device, or other common network node, and typically includes many or all of the elements described above relative to the computer system 1500, although only a single representative remote memory/storage device 1590 is shown in FIG. 15. The logical connections depicted in FIG. 15 include a local area network (LAN) 1593 and a wide area network (WAN) 1595. Such networking environments are often deployed, for example, in offices, enterprise-wide computer networks, intranets, and the Internet.

When used in a LAN networking environment, the computer system 1500 is connected to the local area network 1593 through a network interface or adapter 1596. When used in a WAN networking environment, the computer system 1500 typically includes a broadband modem 1598, network gateway, or other means for establishing communications over the wide area network 1595, such as the Internet. The broadband modem 1598, which may be internal or external, is connected to the system bus 1514 via a serial port interface 1571. In a networked environment, program modules related to the computer system 1500, or portions thereof, may be stored in the remote memory storage device 1590. It is noted that the network connections shown in FIG. 15 are illustrative and other means of establishing a communications link between the computers may be used depending on the specific requirements of an application of the present lazy pluggable file handling.

Figure 16:
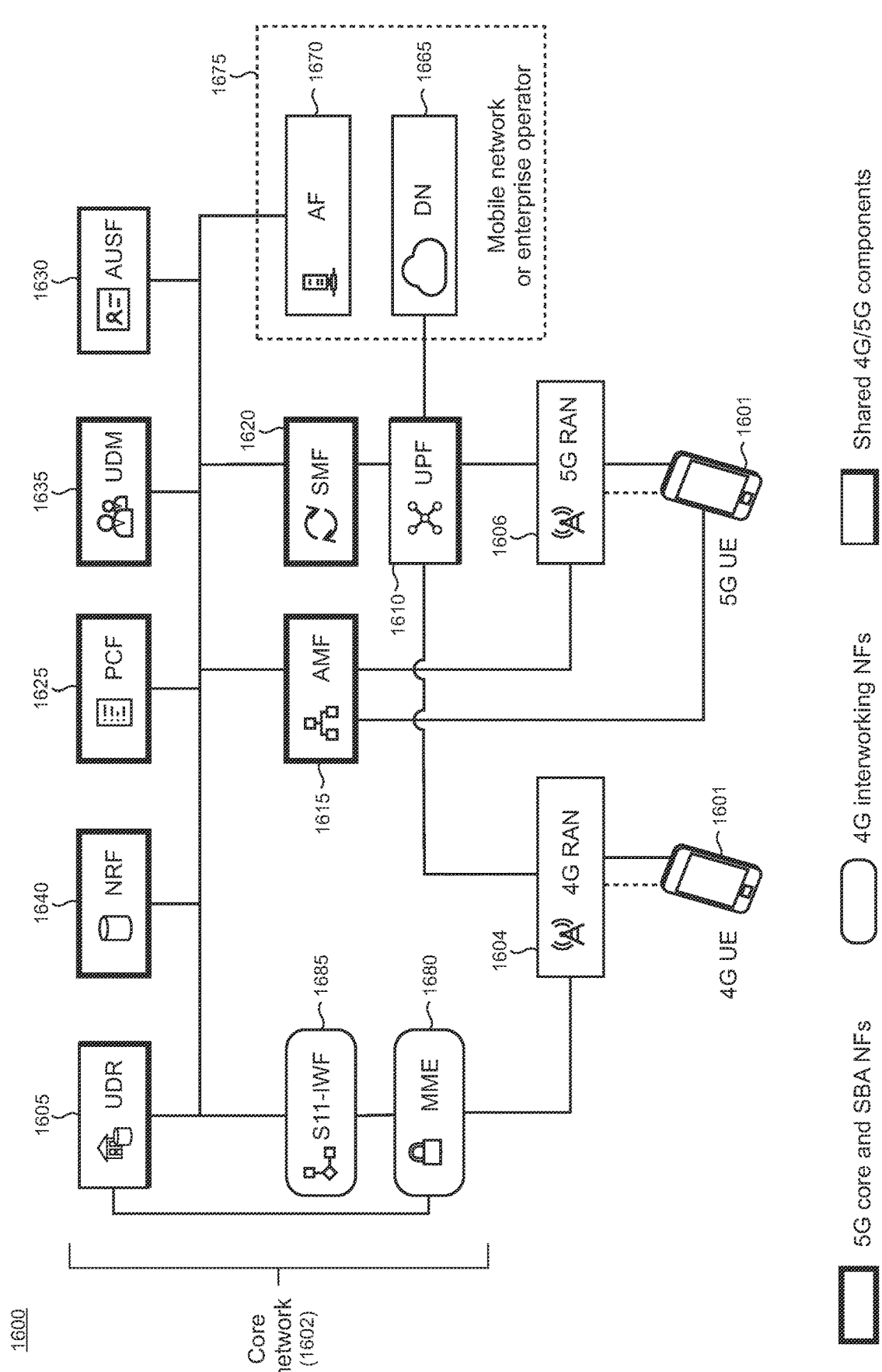
FIG. 16 is a block diagram of an illustrative mobile network that may be used at least in part to implement the present lazy pluggable file handling.

FIG. 16 shows an illustrative mobile network that uses a service-based architecture (SBA) 1600 as defined by the 3GPP (3rd Generation Partnership Project). An SBA provides a modular framework from which common applications can be deployed using components of varying sources and vendors. Control plane functionality and common data repositories of the network are delivered by way of a set of Network Functions (NFs) that are interconnected with a service-based interface bus, in which each has authorization to access each other's services. Assuming the role of either service consumer or service producer, NFs are self-contained, independent, and reusable. Each NF service exposes its functionality through a Service Based Interface (SBI), which employs a well-defined REST (Representational State Transfer) interface using HTTP/2 (Hypertext Transfer Protocol Version 2).

As shown, the mobile network includes a core network (CN) 1602 that is interoperable with 4G (4$^{th}$ generation) and 5G (5$^{th}$ generation) radio access networks (RANs) 1604 and 1606 that support wireless communications with UE 1601. The CN 1602 architecture 1600 supports a 5G next generation core (NGC) network that includes 4G evolved packet core (EPC) instances to enable some 4G LTE (Long Term Evolution) use cases when implementing the present lazy pluggable file handling. With 4G mode, some 5G components such as the UDR (unified data repository) 1605 and UPF (user plane function) 1610 support 4G mode without the need to revert to a legacy 4G stack. Other 4G components include an MME (mobility management entity) 1680 and IWF (interworking function) 1685.

The UPF handles user data, performing operations such as maintaining PDU (Protocol Data Unit) sessions, packet routing and forwarding, packet inspection, policy enforcement for the user plane, QoS (Quality of Service) handling, traffic usage reporting for billing, and the like. The UPF further provides an interconnection point between the mobile network infrastructure and an external data network (DN) 1665. The AF (application function) 1670 provides service or application related information to a VNF service consumer, for example, a mobile network or enterprise operator 1675.

The AMF (access and mobility management function) 1615 receives all connection and session related information from the UE 1601 but is only responsible for handling connection and mobility management tasks such as registration and authentication, identification, and mobility. All messages related to session management are forwarded over an interface to the Session Management Function (SMF) 1620 that establishes and manages sessions. It also selects and controls the UPF 1610 and handles paging. The AF (application function) 1670 provides service or application related information to the NF service consumer. For example, the AF performs operations such as retrieving resources and exposing services to end-users. Other 3GPP-defined 5G network functions in the architecture 1600 include SMF (session management function) 1620; PCF (policy control function) 1625; AUSF (authentication server function 1630; UDM (unified data management) 1635; and NRF (network repository function) 1640.

Various exemplary embodiments of the present lazy pluggable file handling are now presented by way of illustration and not as an exhaustive list of all embodiments. An example includes a computer-implemented method for operating a data processing pipeline, comprising: setting up a pipeline having a plurality of successive processing stages including at least an input stage and an output stage, each stage providing an output that is utilized as an input to a successive stage; receiving a plurality of data files at the input stage, in which the pipeline operates in a resource-constrained computing environment; creating a file view for each of the plurality of data files, each file view including metadata and a content handle for accessing content in a respective data file; passing the file view of each of the plurality of data files through each successive stage in the pipeline; operating the pipeline to transform one or more file views by one or more of the stages, each transformation providing a modification of the metadata or the content in the transformed file view; and outputting, from the output stage, a plurality of transformed file views that the processing stages use to obtain data file information without parsing data file content to minimize processor usage in the resource-constrained computing environment.

In another example, the computer-implemented method further includes passing a transformed file view from a preceding stage to a successive stage and pulling content through the successive stage of the pipeline using a content handle from the passed transformed file view, wherein the content pulling is performed lazily. In another example, the passing of the transformed file view from the preceding to the successive stage is performed using out-of-band processing. In another example, the computer-implemented method further includes generating a plurality of transformed data files from the plurality of transformed file views. In another example, additional stages are plugged into the pipeline to provide additional processing functionality to the pipeline. In another example, the metadata comprises file properties and pipeline-definable tags, and in which the modification comprises writing one or more new values to the file properties or the pipeline-definable tags.

A further example includes one or more hardware-based non-transitory computer-readable memory devices storing computer-executable instructions which, upon execution by one or more processors disposed in a computing device, cause the computing device to: implement a multi-stage processing pipeline including at least an input stage and an output stage, in which each stage processes data from a data file received at the input stage in sequence, and in which the data file comprises a plurality of records; generate an abstract representation of the data file as a file view, the generating including obtaining file properties of the data file and defining one or more tags that are modifiable by the pipeline stages; pass the file view through each stage of the multi-stage processing pipeline, in which each stage transforms the file view in sequence to generate a plurality of transformed file views; and transform records in the data file in each stage based on a respective transformed file view among the plurality of transformed file views.

In another example, a stage of the multi-stage processing pipeline transforms the file view by writing a new value to a tag or by writing a new value to the file properties. In another example, a stage of the multi-stage processing pipeline transforms the file view by creating or modifying a handle by which records that are transformed in the stage are accessed. In another example, the file view includes metadata that is associated with the data file, the file view being modifiable by a stage of the multi-stage processing pipeline by transforming the metadata. In another example, each stage of the multi-stage processing pipeline modifies the metadata in the file view as the file view is passed through successive stages in the multi-stage processing pipeline. In another example, one or more stages of the multi-stage processing pipeline generate new metadata in the file view as the file view is passed through successive stages in the multi-stage processing pipeline. In another example, the file view is configured with a content handle with which a stage in the multi-stage processing pipeline accesses records in the data file. In another example, the file view is used by a stage in the multi-stage processing pipeline to perform pre-processing of the data file without reading the records in the data file.

A further example includes a computing device, comprising: at least one processor; a memory operatively coupled to the at least one processor; at least one hardware-based non-transitory computer-readable storage device having computer-executable instructions stored thereon which, when executed by the least one processor, cause the computing device to: implement a data processing pipeline having multiple stages that successively perform in-band data processing of records in a data file in which records are read from the data file and written to the memory; utilize a file view of the data file, the file view comprising metadata including pipeline-definable tags and further comprising a handle for reading records in the data file; pass the file view through each stage of the multi-stage processing pipeline, in which each stage utilizes out-of-band processing to transform the file view, the out-of-band processing at each stage comprising modifying the metadata and the handle in the file view, the out-of-band processing being independent from the in-band processing of records in the data file; and output a stream of transformed file views from the data processing pipeline in which the in-band processing of records in the data file is performed responsively to records being read by a stage using the handle from a transformed file view in the output stream.

In another example, the data processing pipeline uses the file views to filter or combine records from multiple data files without reading records from the data files. In another example, the metadata further comprises file properties of the data file, the file properties comprising elemental data. In another example, the elemental data comprises one or more of file name, file size, permissions, or creation date. In another example, the multi-stage processing pipeline is instantiated using physical network infrastructure that spans an enterprise network and an edge network. In another example, the multi-stage processing pipeline is instantiated using physical network infrastructure that includes a 4G ($4^{th}$ generation) or a 5G ($5^{th}$ generation) mobile network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for operating a data processing pipeline, comprising:
   setting up a pipeline having a plurality of successive processing stages including at least an input stage and an output stage, each stage using in-band lazy processing to generate an in-band processing pipeline output that is utilized as an input to a successive stage, the pipeline operating in a resource-constrained computing environment;
   receiving a plurality of data files at the input stage, each of the data files comprising records;
   creating a file view for each of the plurality of data files, each file view including metadata and a file handle for accessing content in a respective data file;
   passing the file view of each of the plurality of data files through each successive stage in the pipeline using out-of-band processing performed separately from the in-band lazy processing;
   operating the pipeline to transform one or more file views by one or more of the stages, each transformation comprising one or more of modifying file content, modifying the metadata, modifying the file handle, or providing a new file handle; and
   outputting, from the output stage, an out-of-band stream of transformed file views that the processing stages use to obtain data file information, using in-band lazy processing, without parsing data file content, to minimize processor usage in the resource-constrained computing environment.

2. The computer-implemented method of claim 1 further including passing a transformed file view from a preceding stage to a successive stage and pulling content through the successive stage of the pipeline using a file handle from the passed transformed file view, wherein the content pulling is performed lazily to minimize memory usage in the resource-constrained computing environment.

3. The computer-implemented method of claim 2 in which the passing of the transformed file view from the preceding to the successive stage is performed using out-of-band processing.

4. The computer-implemented method of claim 1 further including generating a plurality of transformed data files from the plurality of transformed file views.

5. The computer-implemented method of claim 1 in which additional stages are plugged into the pipeline to provide additional processing functionality to the pipeline.

6. The computer-implemented method of claim 1 in which the metadata comprises file properties and pipeline-definable tags, and in which the modification comprises writing one or more new values to the file properties or the pipeline-definable tags.

7. One or more hardware-based non-transitory computer-readable memory devices storing computer-executable instructions which, upon execution by one or more processors disposed in a computing device, cause the computing device to:

implement a multi-stage processing pipeline including at least an input stage and an output stage, in which each stage handles data from a data file comprising records received at the input stage in sequence using in-band lazy processing to generate an in-band processing pipeline output, and in which the data file comprises a plurality of records;

generate an abstract representation of the data file as a file view at the input stage, the generating including obtaining file properties of the data file, defining one or more tags that are modifiable by the pipeline stages, and providing a file handle for accessing records in the data file;

pass the file view through each stage of the multi-stage processing pipeline using out-of-band processing performed separately from the in-band lazy processing, in which each stage transforms the file view in sequence to generate a plurality of transformed file views in an out-of-band stream of file views, the file view transformation comprising one or more of updating file properties, modifying the one or more tags, modifying the file handle, or providing a new file handle; and transform records in the data file in each stage using in-band lazy processing based on a respective transformed file view from the out-of-band stream of file views.

8. The one or more hardware-based non-transitory computer-readable memory devices of claim 7 in which a stage of the multi-stage processing pipeline transforms the file view by writing a new value to a tag or by writing a new value to the file properties.

9. The one or more hardware-based non-transitory computer-readable memory devices of claim 7 in which a stage of the multi-stage processing pipeline transforms the file view by creating or modifying a handle by which records that are transformed in the stage are accessed.

10. The one or more hardware-based non-transitory computer-readable memory devices of claim 7 in which the file view includes metadata that is associated with the data file, the file view being modifiable by a stage of the multi-stage processing pipeline by transforming the metadata.

11. The one or more hardware-based non-transitory computer-readable memory devices of claim 10 in which each stage of the multi-stage processing pipeline modifies the metadata in the file view as the file view is passed through successive stages in the multi-stage processing pipeline.

12. The one or more hardware-based non-transitory computer-readable memory devices of claim 10 in which one or more stages of the multi-stage processing pipeline generate new metadata in the file view as the file view is passed through successive stages in the multi-stage processing pipeline.

13. The one or more hardware-based non-transitory computer-readable memory devices of claim 7 in which the file view is configured with a content file handle with which a stage in the multi-stage processing pipeline accesses records in the data file.

14. The one or more hardware-based non-transitory computer-readable memory devices of claim 7 in which the file view is used by a stage in the multi-stage processing pipeline to perform pre-processing of the data file without reading the records in the data file.

15. A computing device, comprising:

at least one processor;

a memory operatively coupled to the at least one processor;

at least one hardware-based non-transitory computer-readable storage device having computer-executable instructions stored thereon which, when executed by the at least one processor, cause the computing device to:

implement a data processing pipeline having multiple stages that successively perform in-band lazy processing of records in a data file in which records are read from the data file and written to the memory;

utilize a file view of the data file, the file view comprising metadata including pipeline-definable tags and further comprising a file handle for reading records in the data file;

pass the file view through each stage of the multi-stage processing pipeline, in which each stage utilizes out-of-band processing, performed separately from the in-band lazy processing, to transform the file view, the out-of-band processing at each stage comprising modifying the metadata and the file handle in the file view, the out-of-band processing being independent from the in-band processing of records in the data file; and output the transformed file views from the data processing pipeline in an out-of-band stream of file views in which the in-band processing of records in the data file is performed responsively to records being read by a stage using the file handle from a transformed file view in the out-of-band stream of file views.

16. The computing device of claim 15 in which the data processing pipeline uses the file views to filter or combine records from multiple data files without reading records from the data files.

17. The computing device of claim 15 in which the metadata further comprises file properties of the data file, the file properties comprising elemental data.

18. The computing device of claim 17 in which the elemental data comprises one or more of file name, file size, permissions, or creation date.

19. The computing device of claim 15 in which the multi-stage processing pipeline is instantiated using physical network infrastructure that spans an enterprise network and an edge network.

20. The computing device of claim 19 in which the multi-stage processing pipeline is instantiated using physical network infrastructure that includes a 4G (4$^{th}$ generation) or a 5G (5$^{th}$ generation) mobile network.

\* \* \* \* \*